(12) United States Patent
Hansen

(10) Patent No.: US 10,690,767 B2
(45) Date of Patent: Jun. 23, 2020

(54) SYSTEM AND METHOD FOR SYNTHETIC APERTURE RADAR IMAGE FORMATION

(71) Applicant: RAYTHEON COMPANY, Waltham, MA (US)

(72) Inventor: Charles T. Hansen, Palos Verdes Estates, CA (US)

(73) Assignee: RAYTHEON COMPANY, Waltham, MA (US)

(*) Notice: Subject to any disclaimer, the term of this patent is extended or adjusted under 35 U.S.C. 154(b) by 255 days.

(21) Appl. No.: 15/838,053

(22) Filed: Dec. 11, 2017

(65) Prior Publication Data

US 2019/0179007 A1 Jun. 13, 2019

(51) Int. Cl.
*G01S 13/90* (2006.01)

(52) U.S. Cl.
CPC ............ *G01S 13/90* (2013.01); *G01S 13/904* (2019.05)

(58) Field of Classification Search
CPC ............................... G01S 13/90; G01S 13/904
USPC ....................................................... 342/25 A
See application file for complete search history.

(56) References Cited

U.S. PATENT DOCUMENTS

| | | | |
|---|---|---|---|
| 4,866,448 A | 9/1989 | Rocca et al. | |
| 5,701,398 A * | 12/1997 | Glier | G06K 9/6273 706/41 |
| 5,708,436 A * | 1/1998 | Loiz | G01S 13/86 342/161 |
| 8,044,846 B1 * | 10/2011 | Urkowitz | G01S 13/582 342/104 |
| 8,102,299 B2 * | 1/2012 | Young | G01S 13/904 342/25 A |
| 2002/0122604 A1 * | 9/2002 | Woodford | G01S 13/904 382/280 |
| 2003/0046689 A1 * | 3/2003 | Gaos | G06Q 30/02 725/34 |
| 2014/0009326 A1 | 1/2014 | Wishart | |

FOREIGN PATENT DOCUMENTS

CN 102 520 403 B 9/2013

OTHER PUBLICATIONS

International Search Report for corresponding international Application No. PCT/US2018/054986, filed Oct. 9, 2018, International Search Report dated Jan. 10, 2019 and dated Jan. 21, 2019 (4 pgs.).
Written Opinion of the International Searching Authority for corresponding international Application No. PCT/US2018/054986, filed Oct. 9, 2018, Written Opinion of the International Searching Authority dated Jan. 21, 2019 (7 pgs.).

(Continued)

*Primary Examiner* — Frank J McGue
(74) *Attorney, Agent, or Firm* — Lewis Roca Rothgerber Christie LLP

(57) ABSTRACT

A system and method for forming synthetic aperture radar images. Radar return pulses are grouped into sub-dwells, and their frequency content is separated into frequency sub-bands. A coarse image is formed for each sub-band/sub-dwell combination. The coarse images are iteratively interpolated to higher resolution and combined, to form a single high-resolution synthetic aperture radar image.

16 Claims, 5 Drawing Sheets

(56) References Cited

OTHER PUBLICATIONS

Munson, David C. et al., "A Tomographic Formulation of Spotlight-Mode Synthetic Aperture Radar", Proceedings of the IEEE, Aug. 1983, pp. 917-925, vol. 71, No. 8.
Perry, R. P. et al., "SAR image formation processing using planar subarrays", Proc SPIE, Jun. 9, 1994, pp. 160-170, vol. 2230.
Xiao, Shu et al., "An $N^2$ log N Back-Projection Algorithm for SAR Image Formation", IEEE, 2000, pp. 3-7.
Yegulalp, Ali F., "Fast Backprojection Algorithm for Synthetic Aperture Radar", IEEE, 1999, pp. 60-65.

* cited by examiner

SYSTEM AND METHOD FOR SYNTHETIC APERTURE RADAR IMAGE FORMATION

GOVERNMENT LICENSE RIGHTS

This invention was made with U.S. Government support under contract No. FA8750-15-C-0021 awarded by the United States Air Force Research Laboratory. The U.S. Government has certain rights in this invention.

FIELD

One or more aspects of embodiments according to the present invention relate to radar, and more particularly to a system and method for the formation of synthetic aperture radar images.

BACKGROUND

Synthetic aperture radar (SAR) is a form of radar that may be used to create two- or three-dimensional images of objects, such as landscapes. Synthetic aperture radar may use the motion of a radar antenna of a given size over a target region to provide higher spatial resolution than the antenna would yield if stationary. A synthetic aperture radar system may be installed on a moving platform, such as an aircraft or spacecraft. The effective aperture size of the synthetic aperture radar system may then be the distance traveled by the platform during an observing interval or "dwell". This distance may be significantly greater than the physical dimensions of the antenna and the resolution of the system may be correspondingly higher.

To create a synthetic aperture radar image, successive pulses of radio waves may be transmitted to illuminate a target scene, and the echo of each pulse may be received and recorded. Signal processing of the successive recorded radar returns allows the combining of the recordings from a plurality of antenna positions.

The processing methods used to generate a high-resolution image from a plurality of radar returns may have various shortcomings. Such methods may be computationally intensive, and poorly suited for distributed computation. Some such methods may also be suitable for use only with narrow fields of view, i.e., in observing scenarios in which the dimensions of the region of ground being imaged are small compared to the distance between the platform and the region of ground being imaged.

Thus, there is a need for an improved system and method for the formation of synthetic aperture radar images.

SUMMARY

Aspects of embodiments of the present disclosure are directed toward a system and method for forming synthetic aperture radar images. Radar return pulses are grouped into sub-dwells, and their frequency content is separated into frequency sub-bands. A coarse image is formed for each sub-band/sub-dwell combination. The coarse images are iteratively interpolated to higher resolution and combined, to form a single high-resolution synthetic aperture radar image.

According to an embodiment of the present invention there is provided a method for generating a synthetic aperture radar image of a ground region, the method including: performing a coarse image formation operation on a plurality of sub-band sub-dwell arrays to form a plurality of two dimensional coarse image arrays; performing a pixel interpolation operation on each of the plurality of coarse image arrays to form a corresponding plurality of two dimensional first interpolated image arrays, each of the first interpolated image arrays being larger, in each of the two dimensions, than the corresponding coarse image array; and performing a first coherent subimage formation operation on the plurality of first interpolated image arrays to form a plurality of first summed images, wherein each of the two dimensional coarse image arrays is a coarse ground plane image of the ground region.

In one embodiment, the performing of the coarse image formation operation includes executing a direct backprojection operation.

In one embodiment, the performing of the coarse image formation operation includes executing a range migration algorithm operation.

In one embodiment, the performing a pixel interpolation operation on a first coarse image array of the plurality of coarse image arrays to form the corresponding first interpolated image array includes forming a pixel of the corresponding first interpolated image array as a weighted sum of pixels of a contiguous subarray of the first coarse image array.

In one embodiment, the performing of the pixel interpolation operation further includes selecting the weights of the weighted sum from a prototype array.

In one embodiment, the performing of the pixel interpolation operation further includes forming the prototype array by evaluating a peak constrained least squares filter function.

In one embodiment, the performing of the pixel interpolation operation further includes forming the prototype array by evaluating a sinc function.

In one embodiment, the selecting of the weights includes: selecting a first weight at a first position in the prototype array having first coordinates, the first coordinates being a function of coordinates of the pixel of the corresponding interpolated image array; and selecting a plurality of additional weights from respective additional positions in the array, each of the additional positions having coordinates separated, in each dimension, from the first coordinates by an integer multiple of a fixed increment.

In one embodiment, the method includes generating, utilizing autofocus, an estimate of unsensed platform motion, wherein the first coordinates are further a function of the estimate of unsensed platform motion.

In one embodiment, the performing of the first coherent subimage formation operation includes summing the first interpolated image arrays, element-wise, four at a time.

In one embodiment, the method includes performing a pixel interpolation operation on the plurality of first summed images to form a corresponding plurality of two dimensional second interpolated image arrays, each of the second interpolated image arrays being larger, in each of the two dimensions, than the corresponding first summed image.

According to an embodiment of the present invention there is provided a system for generating a synthetic aperture radar image of a ground region, the system including a receiver including a processing circuit, the processing circuit being configured to: perform a coarse image formation operation on a plurality of sub-band sub-dwell arrays to form a plurality of two dimensional coarse image arrays; perform a pixel interpolation operation on each of the plurality of coarse image arrays to form a corresponding plurality of two dimensional first interpolated image arrays, each of the first interpolated image arrays being larger, in each of the two dimensions, than the corresponding coarse image array; and perform a first coherent subimage formation operation on the plurality of first interpolated image arrays to form a plurality of first summed images, wherein each of the two dimensional coarse image arrays is a coarse ground plane image of the ground region.

In one embodiment, the performing of the coarse image formation operation includes executing a direct backprojection operation.

In one embodiment, the performing of the coarse image formation operation includes executing a range migration algorithm operation.

In one embodiment, the performing a pixel interpolation operation on a first coarse image array of the plurality of coarse image arrays to form the corresponding first interpolated image array includes forming a pixel of the corresponding first interpolated image array as a weighted sum of pixels of a contiguous subarray of the first coarse image array.

In one embodiment, the performing of the pixel interpolation operation further includes selecting the weights of the weighted sum from a prototype array.

In one embodiment, the performing of the pixel interpolation operation further includes forming the prototype array by evaluating a peak constrained least squares filter function.

In one embodiment, the performing of the pixel interpolation operation further includes forming the prototype array by evaluating a sinc function.

In one embodiment, the selecting of the weights includes: selecting a first weight at a first position in the prototype array having first coordinates, the first coordinates being a function of coordinates of the pixel of the corresponding interpolated image array; and selecting a plurality of additional weights from respective additional positions in the array, each of the additional positions having coordinates separated, in each dimension, from the first coordinates by an integer multiple of a fixed increment.

In one embodiment, the processing circuit is further configured to perform a pixel interpolation operation on the plurality of first summed images to form a corresponding plurality of two dimensional second interpolated image arrays, each of the second interpolated image arrays being larger, in each of the two dimensions, than the corresponding first summed image.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for synthetic aperture radar image formation provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
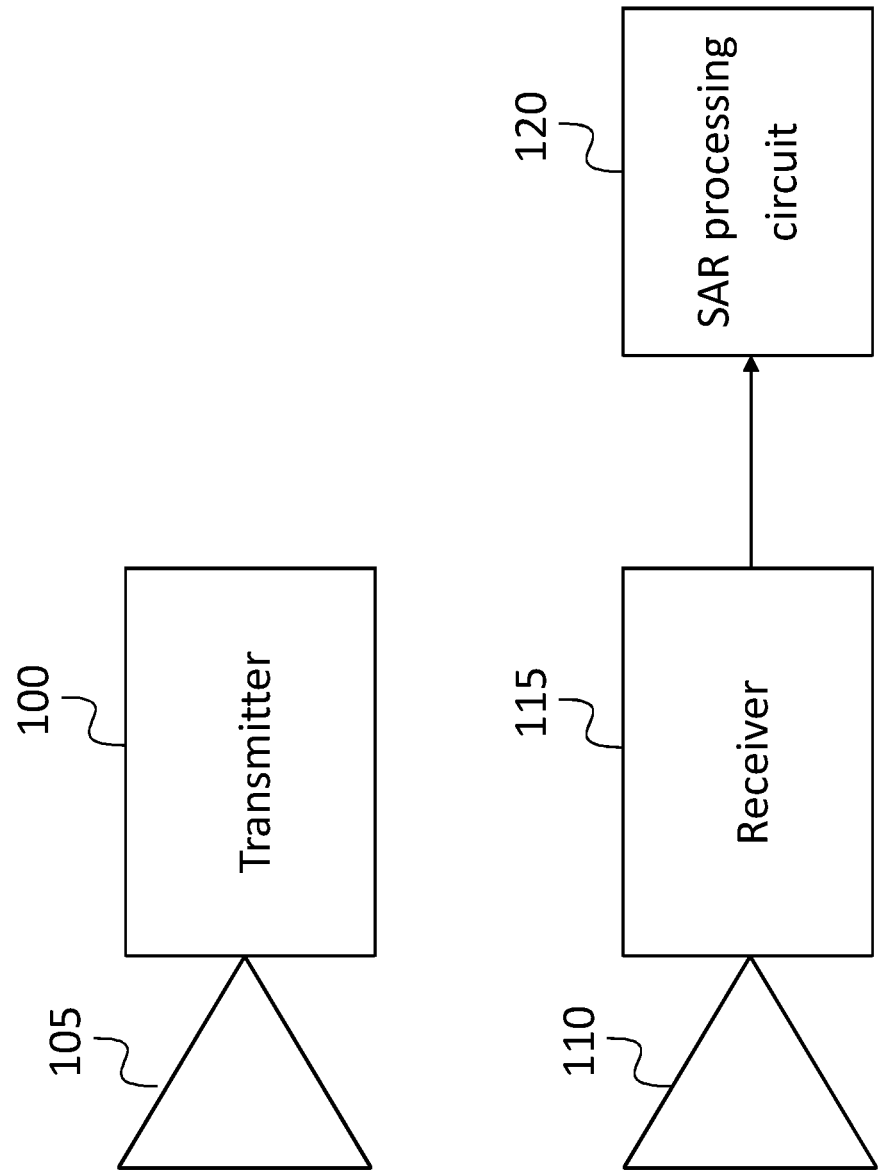
FIG. 1 is a block diagram of a synthetic aperture radar system, according to an embodiment of the present invention.

Referring to FIG. 1, in some embodiments a radar transmitter 100 transmits a sequence of transmitted radar pulses through a transmitting antenna 105. These pulses reflect from a region of ground being imaged and return to be received as pulses (or "radar returns") received by a receiving antenna 110 connected to a radar receiver 115. The receiving antenna 110 may be separate from the transmitting antenna 105 as shown, or the radar transmitter 100 and the radar receiver 115 may share an antenna. The radar receiver 115 digitizes the received pulses and sends them to a synthetic aperture radar processing circuit 120. Each digitized pulse may be an array of complex numbers, for example, representing digitized in-phase and quadrature components of modulation on a carrier. Processing circuits, such as the synthetic aperture radar processing circuit 120, are discussed in further detail below.

Each transmitted pulse may have a certain waveform that may be represented, for example, by a sequence of complex numbers specifying how the phase and amplitude of a carrier signal changes with time. Each radar return may then have an amplitude that depends on the transmitted pulse waveform, and on the region of ground from which it reflected.

Figure 2:
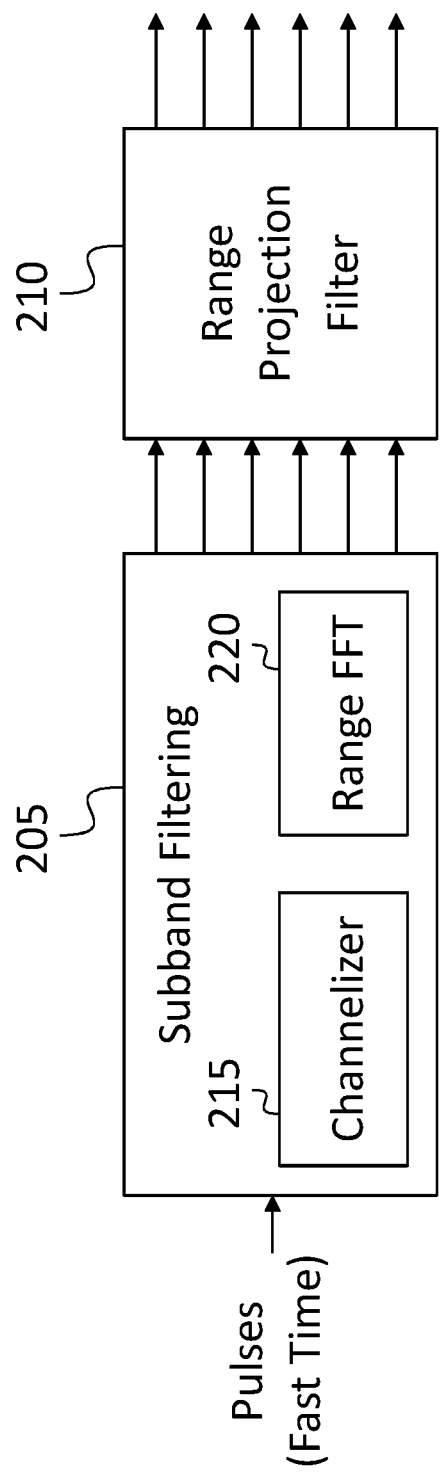
FIG. 2 is a block diagram of a first portion of a synthetic aperture radar system, according to an embodiment of the present invention.

Referring to FIG. 2, a first portion of the synthetic aperture radar processing circuit 120 may include a sub-band filtering circuit 205 and a range projection filter 210. The sub-band filtering circuit 205 may include a channelizer 215 and a fast Fourier transform (FFT) circuit 220 (which performs an operation that may also be referred to as a "range FFT"). Its effect may be to act as a filter bank, separating each received pulse into frequency components in respective frequency ranges corresponding to a plurality of sub-bands. In some embodiments there are about 1000 or about 10,000 sub-bands. A fast Fourier transform may be taken of each pulse, in each sub-band. The sub-band filtering circuit 205 may have a plurality of outputs, each carrying a stream of pulses from a respective sub-band of the sub-band filtering circuit 205. FIG. 2 shows a relatively small number of outputs for clarity; in some embodiments the sub-band filtering circuit 205 has one output per sub-band, e.g., 1000 or more such outputs.

The range projection filter 210 may be a matched filter that performs half of a fast correlation with the waveform of the outgoing pulse (i.e., it may multiply the input data stream by a Fourier transform of the waveform of the outgoing pulse). It may be employed to make the frequency response of the circuit of FIG. 2 substantially uniform regardless of the spectral content of the transmitted pulses. Like the sub-band filtering circuit 205, the range projection filter 210 may have a plurality of outputs, each carrying a stream of pulses from a respective sub-band of the range projection filter 210.

Figure 3:
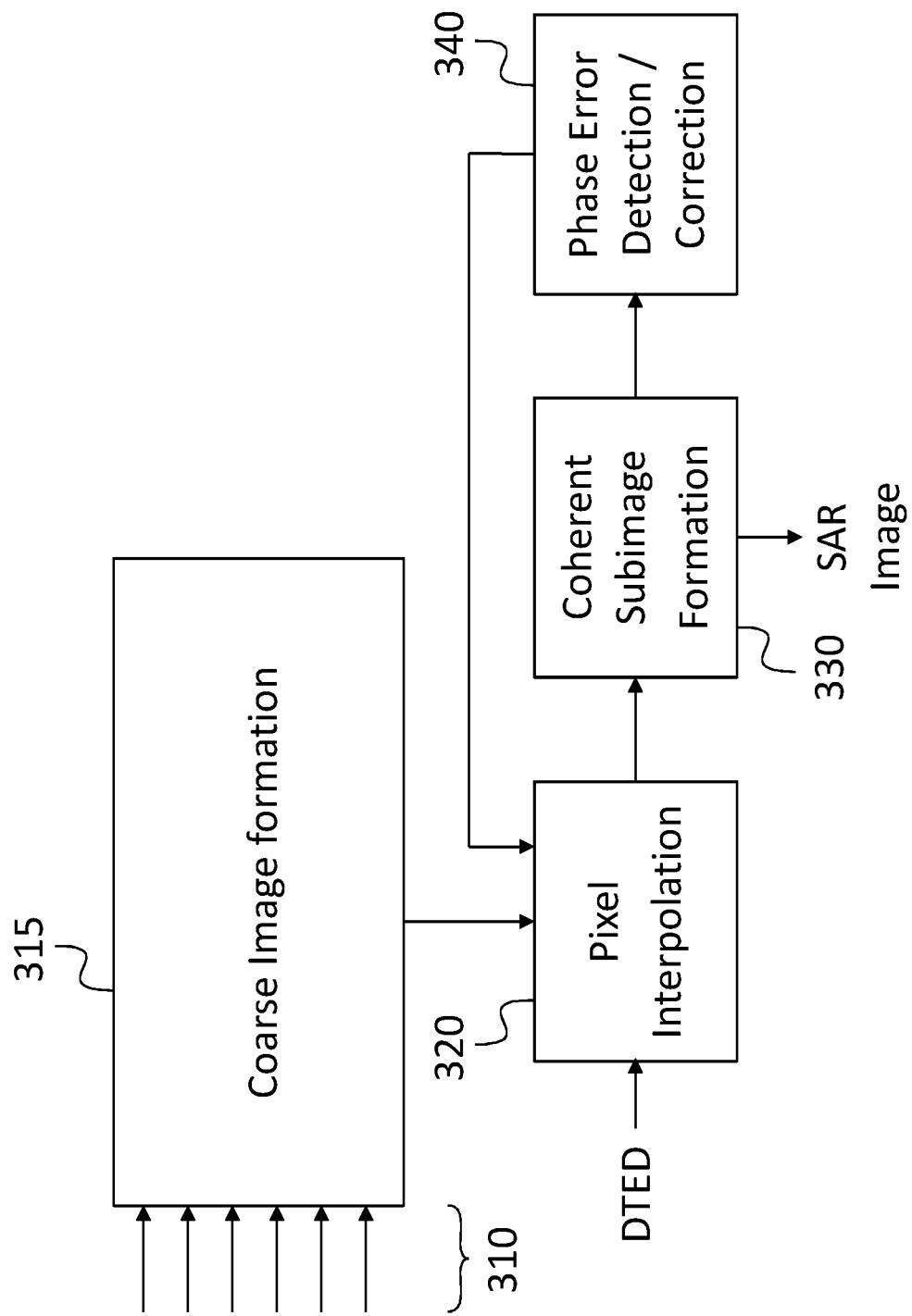
FIG. 3 is a block diagram of a second portion of a synthetic aperture radar system, according to an embodiment of the present invention.
Figure 4:
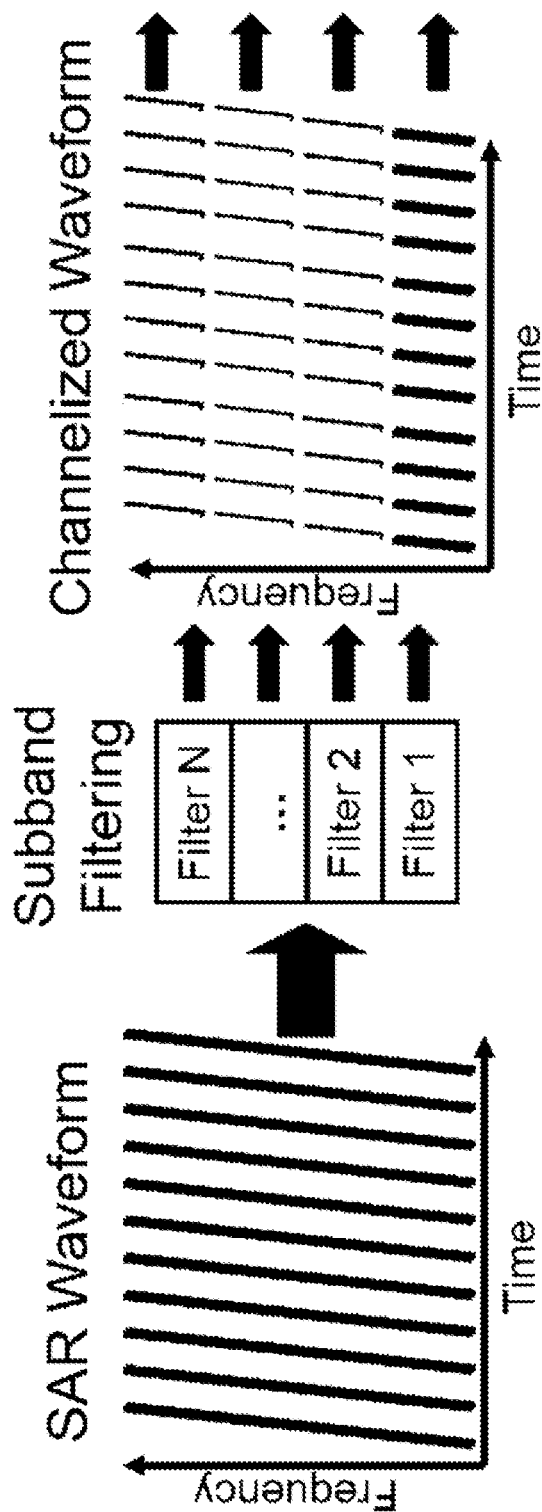
FIG. 4 is a schematic illustration of the effect of a channelizing circuit, according to an embodiment of the present invention.

FIG. 3 shows a second portion of the synthetic aperture radar processing circuit 120. In some embodiments, the streams of pulses generated by the circuit of FIG. 2 are fed to the array 310 of pulse inputs (which may be implemented in hardware as an array of conductors) of the coarse image formation circuit 315, which may be a processing circuit, discussed in further detail below. The coarse image formation circuit 315 may group the received pulses into groups of pulses, each group corresponding to an interval of time referred to as a sub-dwell. This process is illustrated in FIG. 4. FIG. 4 shows the processing that may occur when each received radar pulse has a chirped waveform, e.g., a frequency that increases with time. In such a case, the signal within each sub-band may be nonzero during each time interval in which the frequency falls within the sub-band, and substantially zero otherwise, as shown in the right-hand graph of FIG. 4. This filtering function may be performed by the combination of the channelizer 215 and the coarse image formation circuit 315.

Each sub-band within a sub-dwell may be represented, conceptually, as a three-dimensional array (referred to as a sub-band sub-dwell array), where a first dimension is indexed by sub-band number, a second dimension is indexed by pulse number, and a third dimension is indexed by sample number, where each pulse (at a respective sub-band index and pulse number index) consists of a plurality of samples. This three dimensional array may then be processed by a coarse image formation algorithm performed by the coarse image formation circuit 315, which is any algorithm that generates a ground plane image, such as a direct backprojection algorithm or a range migration algorithm. If the sub-band extends over a relatively small fraction of the total system bandwidth and the sub-dwell is a relatively small fraction of the dwell, then the resolution of the coarse ground plane image may be relatively coarse compared to the resolution that could be achieved if data from the entire bandwidth and dwell were fed into an image formation algorithm.

Accordingly, the output of the coarse image formation circuit 315 may be a large number of low-resolution synthetic aperture radar images. These images may then be combined, in a method described in further detail below, to form a single high-resolution synthetic aperture radar image. This approach, of forming a large number of low-resolution ground plane images and combining them into a single high resolution image may have advantages both in terms of reducing distortion that might otherwise occur when the field of view is large (i.e., the transverse dimensions of the region of ground being imaged are not small compared to the range) and in terms of resulting in an algorithm well suited for parallelization, e.g., for execution on a large number of parallel processors, such as may be present in a graphics processing unit. The single high-resolution synthetic aperture radar image may be used, for example, to identify a target and to guide a platform (e.g., the platform carrying the laser system, or another platform) to the target.

For example, four coarse image arrays, each having dimensions of 12×12 pixels, from two adjacent sub-bands and two adjacent sub-dwells may be combined into a single higher-resolution, 14×14 image (referred to as a "summed image") by first converting each of the four 12×12 coarse image arrays into a corresponding 14×14 array (referred to herein as a "first interpolated image array") using a pixel interpolation operation (performed by a pixel interpolation circuit 320), and then coherently summing the four 14×14 first interpolated image arrays.

The pixel interpolation operation may be performed by the pixel interpolation circuit 320 using a finite impulse response interpolator, which forms weighted sums of pixels in contiguous subarrays of the coarse image array, based on a prototype array from which weights, for the weighted sums, may be selected. Because the interpolator operates as a finite impulse response filter, the weights may also be referred to as "taps". The selected weights may then be used to form each pixel of the first interpolated image array as a weighted average of the pixels of a region of the coarse image array. For example (if the coarse image array is conceptually oriented as having one vertical dimension and a horizontal (left-right) dimension), a weighted sum of the pixels in the 5×5 region at the top left corner of the coarse image array (this region being one that corresponds to a contiguous subarrays of the coarse image array) may be formed by multiplying each pixel in the 5×5 region by a corresponding weight selected from the prototype array, and summing the products. This weighted sum may then become the top left pixel of the first interpolated image array. A weighted sum of the same 5×5 region using different weights selected from the same prototype array may be used to generate the pixel in the top row, and second from the left, in the first interpolated image array. Each of the two leftmost pixels in the second row from the top of the first interpolated image array may similarly be formed as a weighted sum of the 5×5 region at the top left corner of the coarse image array, using different respective sets of weights from the same prototype array. The third pixel in the top row of the first interpolated image array may be formed as a weighted sum of a 5×5 region that is at the top of the coarse image array and offset by one pixel from the left edge of the coarse image array, and the other three pixels of the 2×2 region separated by two columns from the left edge of the first interpolated image array may similarly be formed as different weighted sums of the 5×5 region at the top of the coarse image array and offset by one pixel from the left edge of the coarse image array.

This process may be repeated for each of the 49 (7×7) (overlapping) 5×5 regions of the 12×12 coarse image array, each 5×5 region of the coarse image array being used to form a 2×2 region of the first interpolated image array. As a result, the first interpolated image array is a 14×14 array, i.e., it is larger, in each of its two dimensions, than the 12×12 coarse image array from which it is formed.

The prototype array may be a relatively large (e.g., 200×200) array that may be generated, for example, as samples of (i.e., by evaluating, at 200×200 different values) a peak constrained least squares filter function or a two-dimensional sinc function (i.e., a two-dimensional (sin x)/x function). Weights may be selected from the prototype array at evenly spaced locations offset according to the position of the pixel of the first interpolated image array being formed, and further offset according to estimated unsensed platform motion, which may be estimated using an autofocus algorithm (executed by a phase error detection and correction circuit 340) as described in further detail below. For example, in the absence of unsensed platform motion, the top left pixel of the first interpolated image array may be formed using weights selected from prototype array elements each having a horizontal coordinate selected from the set {0, 40, 80, 120, 160} and a vertical coordinate also selected from the set {0, 40, 80, 120, 160}. The pixel in the top row, and second from the left, in the first interpolated image array may be formed using weights selected from prototype array elements each having a horizontal coordinate selected from the set {20, 60, 100, 140, 180} and a vertical coordinate also selected from the set {0, 40, 80, 120, 160}. Other pixels of the first interpolated image array may be formed using weights selected from prototype array elements selected in an analogous manner.

Each element of the coarse image array and each element of the first interpolated image array may be a complex number. Accordingly, the four first interpolated image arrays (formed from the coarse image arrays from two adjacent sub-bands and two adjacent sub-dwells) may be combined, using a first coherent subimage formation operation (performed by a coherent subimage formation circuit 330), to form a first summed image. The coherent subimage formation operation may consist of forming an arithmetic mean of the complex numbers (complex pixel values) for corresponding pixels from the four first interpolated image arrays. For example, the top left pixel of the first summed image may be one quarter of the complex sum of the four respective complex values of the respective top left pixels of the four first interpolated image arrays.

Figure 5:
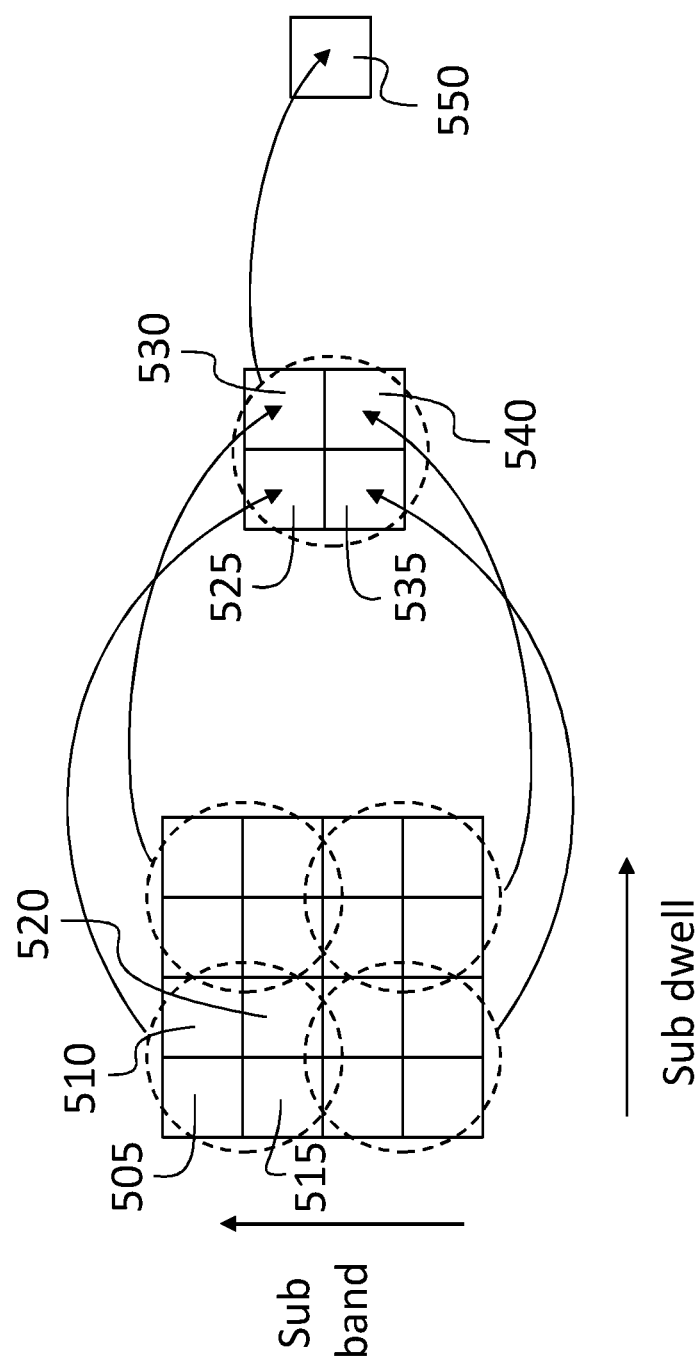
FIG. 5 is a schematic illustration of an iterative process of combining images to create an increasingly smaller number of higher resolution images.

This process may be repeated iteratively, as illustrated in FIG. 5. A set of coarse image arrays 505, 510, 515, 520 may each be interpolated (by the pixel interpolation circuit 320) and then coherently combined (by the coherent subimage formation circuit 330) to form a first summed image 525. Further summed images 530, 535, 540 may be formed in an analogous manner, as indicated by the curved arrows of FIG. 5. The four summed images 525, 530, 535, 540 may then be used as "coarse" subimage arrays (each being, however, less coarse than any of the coarse image arrays 505, 510, 515, 520), interpolated and summed coherently to form a still less coarse image array 550. This iterative process may be repeated as needed to reduce the original, large, set of coarse image arrays, to a single high-resolution synthetic aperture radar image, the number of images being reduced by a factor of four at each iteration. For example, if the original set of coarse images consists of 1024 images, in a grid of 32 sub-bands by 32 sub-dwells, a single image may be formed after 5 iterations (1024 being equal to 4 raised to the power of 5). An advantage of the iterative process described here and in FIG. 5 is that it makes possible considerable computational efficiency. In some embodiments, the number of operations performed is proportional to the logarithm of the number of samples multiplied by the number of samples.

The images (coarse and increasingly fine images) represented by squares in FIG. 5 have, internally, coordinates (e.g., range and cross range) corresponding to position on the ground, but they are arranged, in FIG. 5, relative to each other, for purposes of illustration, in positions corresponding to the sub-band and sub-dwell indices from which they were formed, as indicated by the arrows. As such, the arrows labeled "sub-band" and "sub-dwell" refer to the positions of the squares in FIG. 5 and not to the coordinates within the images that the squares represent.

As mentioned above, an autofocus algorithm (executed by a phase error detection and correction circuit 340) may be used to estimate unsensed platform motion, and this estimated unsensed platform motion may be used to offset the indices of the weights used for pixel interpolation. The input to the autofocus algorithm is the coarse images at each stage of the processing. The autofocus extracts the phase correction by analyzing the coarse images, then applies that phase correction to those same coarse images. The result are finer coarse images, and the process repeats until the final image is complete. Input from a digital terrain elevation database (DTED) may also be used to offset the indices of the weights used for pixel interpolation, as shown in FIG. 3.

The circuits of FIG. 2 and FIG. 3 may each be processing circuits, or may be parts of a single processing circuit. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example a processing circuit may include two processing circuits, an FPGA and a CPU, interconnected on a PWB.

In other embodiments, the functions of some or all of circuits of FIGS. 2 and 3 (including the functions of the coarse image formation circuit 315, the pixel interpolation circuit 320, the coherent subimage formation circuit 330, and the phase error detection and correction circuit 340) may be implemented in software or firmware executing on a stored program computer. In such an embodiment, one such stored program computer may perform several of the operations (e.g., pixel interpolation and coherent subimage formation) or a separate stored program computer may be dedicated to a single such operation. In some embodiments, similar operations may be performed in parallel, e.g., by separate parallel processors of a graphics processing unit. For example, a large number of coarse image formation operations may be performed in parallel, and large numbers of pixel interpolation and coherent subimage formation operations may also be performed in parallel.

The performance of some embodiments may be understood from the following analysis.

Overview

The Coarse Image Backprojection algorithm is a variant of fast backprojection that achieves its resolution objectives by progressively and iteratively forming finer resolution images from coarse images generated by processing sub-dwells and sub-bands of the incoming radar signal. While any number of sub-bands or sub-dwells can be combined at any one time, increased processing efficiency may be achieved when pairs of sub-band coarse images are combined with pairs of sub-dwell images. This means that four coarse images are combined in each fundamental operation. The number of sub-bands and sub-dwells is therefore closely related to the number of backprojection iterations.

The description of the basic algorithm that follows is divided into four sections, corresponding to the three steps necessary to prepare the data for the backprojection algorithm, and the backprojection algorithm itself. These are: parameter computation, pulse to pulse processing, sub-dwell coarse image formation, and backprojection iteration.

Following these are additional sections describing particular details of the algorithm.

Signal and Processing Model

The transmitted waveform may be modeled as follows:

$$x_T(t) = A_T(t)\exp(2\pi\phi_T(t))$$

Where $A_T(t)$ is a real window function and all of the phase information is contained within $\phi_T(t)$. This quantity is given by $$\phi_T(t) = f_{ct}(t - t_{0T}) + f_{off}(t - \tau_{0n}) + \phi_{cn}(t - \tau_{0n}),$$

where $t_{0T}$ is the time reference for the transmit local oscillator, $\tau_{0n}$ is the time reference for pulse n and $\phi_{cn}$ is the phase modulation on pulse n, which may vary from pulse to pulse. For example, for a linear frequency modulated waveform, $$\phi_{cn}(t - \tau_{cn}) = \frac{\gamma}{2}(t - \tau_{cn})^2.$$

In addition $f_{off}$ is the waveform synthesizer offset frequency.

The two way range may be defined to be R; the delay from transmit to receive is

Therefore $$\Delta t_R = \frac{R}{c},$$

where c is the speed of light in the atmosphere.

Therefore, the received signal from a point scatterer is $$x_R(t) = A_T\left(t - \frac{R}{c}\right)\exp\left(\left(2\pi i\phi_T\left(t - \frac{R}{c}\right)\right)\right).$$

The phase of the transmitted signal on receive is therefore $$f_{ct}\left(t - \frac{R}{c} - t_{0T}\right) + f_{off}\left(t - \frac{R}{c} - \tau_{0n}\right) + \phi_{cn}\left(t - \frac{R}{c} - \tau_{0n}\right). \quad (1)$$

The received signal may be modeled as follows. The signal described in Equation (1) is downconverted with the receive local oscillator, the phase of which is given by $$\phi_{rxlo}(t) = f_{CR}(t - t_{0R}) + f_{off,R}(t - \tau_{Dn})$$

This gives:

$$\phi_{RX} = f_{CT}\left(t - \frac{R}{c} - t_{0T}\right) - f_{CR}(t - t_{0R}) +$$

$$f_{offT}\left(t - \frac{R}{c} - \tau_{0n}\right) - f_{offR}(t - \tau_{Dn}) + \phi_{cn}\left(t - \frac{R}{c} - \tau_{0n}\right)$$

The sampling and digitization may be modeled as follows. The digitizer in the receiver will sample the incoming waveform at the following set of times:

$$t_{kn} = \Delta t_{A/D}\left(k - \frac{K-1}{2}\right) + \tau_{ADn}.$$

Parameter Computation

In some embodiments, the coarse image projection algorithm is fully parameter driven. All of the processing adjusts to the input signals through the use of a few key parameters. These are described in the next sections.

Geometry and System Input Parameters

| Variable | Description |
|---|---|
| | Mode constants |
| $N_{ap}$ | Number of pulses in the collection |
| $\rho_{rg}$ | Nominal Range Resolution |

-continued

| Variable | Description |
|---|---|
| $\rho_{az}$ | Nominal Azimuth Resolution |
| $N_{bpi}$ | Number of Backprojection iterations |
| | Waveform Parameters |
| $f_c$ | Carrier Frequency in Hertz. This plus $f_{off}$ the offset frequency define the center frequency of the waveform. |
| $f_{off}$ | Frequency Synthesizer offset frequency in Hertz. The center frequency of the waveform before the carrier is applied. For some classes of waveforms, this is zero. |
| $\tau_{pr}$ | Pulse repetition interval. This may be expressed as an integer number of clocks times the clock period. |
| $B_{rg}$ | Signal bandwidth in fast time. This may be used to determine how many frequency bins are valid. |
| $\tau_p$ | Pulse length |
| | Receive ParameteRS |
| $\Delta t_{A/D}$ | Analog to digital converter sample time in seconds. This sets some of the relevant frequency scales. |
| $K_{rg}$ | Number of samples in the receive window. |

Static Mode Parameters

Pulse to pulse processing parameters may be derived as follows. The first step in pulse to pulse processing is a Fourier transform in range. This serves as the first step in pulse compression. The smallest size Fourier transform that is a power of two is given by:

$$K_{rgft} = 2^{\lceil log2 K_{rg} \rceil},$$

where the $\lceil , \rceil$ represents rounding up to the nearest integer.

This Fourier transform is done in sub-bands. The number of sub-bands is $$K_{chan} = 2^{(N_{bpi}-1)}$$

The total number of sub-bands in the channelizer may be constrained as follows:

$$K_{cft} = \min(K_{cft,max}, K_{rgft}, N_c K_{chan})$$

The number of samples in the range projection filter may be an integer multiple of the number of sub-bands. Each sub-band may also be an integer number of sub-bands:

$$K_{rgpf} = \frac{K_{chan}K_{rgft}}{K_{cft}}\left\lceil\frac{B_{rg}\Delta t_{A/D}K_{cft}}{K_{chan}}\right\rceil.$$

Sub-dwell processing parameters may be derived as follows.

The number of pulses in each sub-dwell is given by:

$$N_{sd} = \frac{N_{ap}}{2^{(N_{bpi}-1)}}.$$

The nominal resolution of the coarse image generated using each sub-dwell is given by:

$$\rho_{azsd} = \rho_{az}2^{(N_{bpi}-1)}.$$

The pixel spacing in the coarse image may ensure oversampling by a factor of 2:

$$d_{xsd} = \frac{\rho_{azsd}}{2}.$$

Similarly, in the range direction, $\rho_{rgsb} = \rho_{ry} 2^{(N_{bpi}-1)}$.

The pixel spacing in the coarse image may ensure oversampling by a factor of 2:

$$d_{ysb} = \frac{\rho_{rgsb}}{2}.$$

These values may be used to calculate the pixel spacing for all of the backprojection iterations:

$$d_x(n_{bpi}) = \frac{d_{xsd}}{2^{n_{bpi}}}, \text{ and}$$

$$d_y(n_{bpi}) = \frac{d_{ysb}}{2^{n_{bpi}}},$$

where $n_{bpi} = 0, \ldots, N_{bpi}-1$

Backprojection iteration processing parameters may be derived as follows. The number of pixels in each image (in each of the two directions, in the case that the image is not square, or the case in which the pixels are rectangular) as a function of iteration, is given by $$K_y(n_{bpi}) = 2\left\lceil \frac{\Delta R}{2d_y(n_{bpi})} \right\rceil + N_{i,pad}, \text{ and}$$

$$N_x(n_{bpi}) = 2\left\lceil \frac{\Delta R}{2d_x(n_{bpi})} \right\rceil + N_{i,pad},$$

respectively.

Sub-Dwell Parameters

The sub-dwell parameters are the center points of the sub-dwell apertures in both frequency and slow time. These parameters are given by:

$$n_{ac,mid}(n_{sdi}, n_{bpi}) = n_{sdi}N_{sd}2^{n_{bpi}} + N_{sd}2^{n_{bpi}-2},$$

$$x_{ac,mid} = \frac{x_{ac}(\lfloor n_{ac,mid} \rfloor) + x_{ac}(\lceil n_{ac,mid} \rceil)}{2}, \text{ and}$$

$$K_{sb,mid}(n_{bpi}, k_{sbi}) = k_{sbi}K_{sb}2^{n_{bpi}} + K_{sb}2^{(n_{bpi}-1)} - (K_{sb}2^{(N_{bpi}-1)})/2.$$

Pulse to Pulse Processing

For pulse to pulse processing, the data may be aligned to a contiguous block of frequency bins. The first step in the processing is a frequency shift that accomplishes that.

$$x_{rxfs} = x_{rx}\exp\left[2\pi i\left(k - \left\lceil \frac{K_{rgft}-1}{2} \right\rceil\right)\frac{K_{rgpf}-1}{2K_{rgft}}\right]$$

The channelizer breaks the data into frequency sub-bands and also transforms each to frequency space.

Parameters include:

N: Size of the input pulse (the data is padded with zeros if it initially has fewer than N samples), M: Number of sub-bands, $K_{ov}$: Oversampling ratio inside the channelize, and $w_{ps}$: Channelizer filter weights.

The input pulse is broken into $$K = \frac{K_{ov}N}{M}$$

overlapping time segments of length M. Each time segment starts at an integer multiple of /$K_{ov}$.

Each time segment is shifted and weighted, then the sub-bands are formed with a fast Fourier transform.

$$y(k, m') = fft\left[x_{rx}\left(\frac{kM}{K_{ov}} + m\right)w_{ps}(m)\exp\left(-\frac{\pi im}{M}\right)\right]$$

Then each sub-band is transformed into frequency space: $y_f(k',m') = fft(y(k,m))$, and the samples to be used are pushed to the output:
$x_{rgft}(k'+Km') = y_f(k',m')$.

Projection Filter

The projection filter is an equalization filter that is applied in frequency space to flatten the frequency response and ensure that the frequency content of every pulse is the same, even if the pulses themselves all have different modulation.

In essence the projection filter can be described as a pointwise complex division of the transformed receive pulse by the transformed ideal pulse:

$$x_{rgpf}(k_{rgpf}) = \frac{x_{rgft}(k_{rgpf})}{x_{pf}(k_{rgpf})}.$$

Sub-Dwell Coarse Image Formation

The coarse image is given by:

$$x_{cimg}(k_y, n_x, k_{sbi}, n_{sdi}) = \sum_{n_p}\sum_{k_{sb}} x_{rgft}(k_{sb}, n_p)\exp(-2\pi i\phi_{pf,pix}(k_y, n_x, k_{sb}, n_p)), \text{ where}$$

$$\phi_{pf,pix} = -f_{sb}\frac{(R_{t,pix} - R_{t,mid})}{c} + \phi_{off} + k_{t,sb}\left(\Delta\tau_{A/D} - \frac{R_{t,pix}}{x}\right) \text{ and}$$

$$R_{t,pix} = 2\sqrt{\|x_p(k_y, n_x) - x_{ac}(n_p)\|^2} \text{ and}$$

$$R_t, mid = 2\sqrt{\|x_p(k_y, n_x) - x_{ac,mid}(n_{sdi})\|^2}.$$

Backprojection Iteration

The backprojection iteration function forms a fine image by coherently summing interpolated pixels from four coarse images, two sub-bands and two sub-dwells:

$$x_{cimg}(n_{bpi},k_y,n_x,k_{sbi},n_{sdi}) = \Sigma_{k'_{sbi},n'_{sdi}} x_s(k_y,n_x,k'_{sbi},n'_{sdi}) \exp(2\pi i\phi_{as}(k_y,n_x,k'_{sbi},n'_{sdi}))$$

Although limited embodiments of a system and method for synthetic aperture radar image formation have been specifically described and illustrated herein, many modifications and variations will be apparent to those skilled in the art. Accordingly, it is to be understood that the system and method for synthetic aperture radar image formation employed according to principles of this invention may be embodied other than as specifically described herein. The invention is also defined in the following claims, and equivalents thereof.

What is claimed is:

1. A method for generating a synthetic aperture radar image of a ground region, the method comprising:

performing a coarse image formation operation on a plurality of sub-band sub-dwell arrays to form a plurality of two dimensional coarse image arrays;

performing a pixel interpolation operation on each of the plurality of coarse image arrays to form a corresponding plurality of two dimensional first interpolated image arrays, each of the first interpolated image arrays being larger, in each of the two dimensions, than the corresponding coarse image array;

performing a first coherent subimage formation operation on the plurality of first interpolated image arrays to form a plurality of first summed images;

performing a pixel interpolation operation on the plurality of first summed images to form a corresponding plurality of two dimensional second interpolated image arrays, each of the second interpolated image arrays being larger, in each of the two dimensions, than the corresponding first summed image; and performing a second coherent subimage formation operation on the plurality of second interpolated image arrays to form a plurality of second summed images, wherein each of the two dimensional coarse image arrays is a coarse ground plane image of the ground region, wherein each of the first interpolated image arrays is a ground plane image of the ground region, wherein each of the second interpolated image arrays is a ground plane image of the ground region, and wherein the performing a pixel interpolation operation on a first coarse image array of the plurality of coarse image arrays to form the corresponding first interpolated image array comprises forming a pixel of the corresponding first interpolated image array as a weighted sum of pixels of a contiguous subarray of the first coarse image array.

2. The method of claim 1, wherein the performing of the coarse image formation operation comprises executing a direct backprojection operation.

3. The method of claim 1, wherein the performing of the coarse image formation operation comprises executing a range migration algorithm operation.

4. The method of claim 1, wherein the performing of the pixel interpolation operation further comprises selecting the weights of the weighted sum from a prototype array.

5. The method of claim 4, wherein the performing of the pixel interpolation operation further comprises forming the prototype array by evaluating a peak constrained least squares filter function.

6. The method of claim 4, wherein the performing of the pixel interpolation operation further comprises forming the prototype array by evaluating a sinc function.

7. The method of claim 4, wherein the selecting of the weights comprises:
selecting a first weight at a first position in the prototype array having first coordinates, the first coordinates being a function of coordinates of the pixel of the corresponding interpolated image array; and
selecting a plurality of additional weights from respective additional positions in the array, each of the additional positions having coordinates separated, in each dimension, from the first coordinates by an integer multiple of a fixed increment.

8. The method of claim 7, further comprising generating, utilizing autofocus, an estimate of unsensed platform motion, wherein the first coordinates are further a function of the estimate of unsensed platform motion.

9. The method of claim 1, wherein the performing of the first coherent subimage formation operation comprises summing the first interpolated image arrays, element-wise, four at a time.

10. A system for generating a synthetic aperture radar image of a ground region, the system comprising a receiver comprising a processing circuit, the processing circuit being configured to:

perform a coarse image formation operation on a plurality of sub-band sub-dwell arrays to form a plurality of two dimensional coarse image arrays;

perform a pixel interpolation operation on each of the plurality of coarse image arrays to form a corresponding plurality of two dimensional first interpolated image arrays, each of the first interpolated image arrays being larger, in each of the two dimensions, than the corresponding coarse image array;

perform a first coherent subimage formation operation on the plurality of first interpolated image arrays to form a plurality of first summed images;

perform a pixel interpolation operation on the plurality of first summed images to form a corresponding plurality of two dimensional second interpolated image arrays, each of the second interpolated image arrays being larder, in each of the two dimensions, than the corresponding first summed image; and perform a second coherent subimage formation operation on the plurality of second interpolated image arrays to form a plurality of second summed images, wherein each of the two dimensional coarse image arrays is a coarse ground plane image of the ground region, wherein each of the first interpolated image arrays is a ground plane image of the ground region, wherein each of the second interpolated image arrays is a ground plane image of the ground region, and wherein the performing a pixel interpolation operation on a first coarse image array of the plurality of coarse image arrays to form the corresponding first interpolated image array comprises forming a pixel of the corresponding first interpolated image array as a weighted sum of pixels of a contiguous subarray of the first coarse image array.

11. The system of claim 10, wherein the performing of the coarse image formation operation comprises executing a direct backprojection operation.

12. The system of claim 10, wherein the performing of the coarse image formation operation comprises executing a range migration algorithm operation.

13. The system of claim 10, wherein the performing of the pixel interpolation operation further comprises selecting the weights of the weighted sum from a prototype array.

14. The system of claim 13, wherein the performing of the pixel interpolation operation further comprises forming the prototype array by evaluating a peak constrained least squares filter function.

15. The system of claim 13, wherein the performing of the pixel interpolation operation further comprises forming the prototype array by evaluating a sinc function.

16. The system of claim 13, wherein the selecting of the weights comprises:
selecting a first weight at a first position in the prototype array having first coordinates, the first coordinates being a function of coordinates of the pixel of the corresponding interpolated image array; and
selecting a plurality of additional weights from respective additional positions in the array, each of the additional positions having coordinates separated, in each dimension, from the first coordinates by an integer multiple of a fixed increment.

\* \* \* \* \*